United States Patent
Amit et al.

(10) Patent No.: US 9,077,688 B2
(45) Date of Patent: Jul. 7, 2015

(54) ACCESS CONTROL SYSTEM FOR A MOBILE DEVICE

(71) Applicant: SKYCURE LTD, Tel-Aviv (IL)

(72) Inventors: Yair Amit, Tel-Aviv (IL); Adi Sharabani, Ramat-Gan (IL)

(73) Assignee: SKYCURE LTD, Tel Aviv (IL)

(*) Notice: Subject to any disclaimer, the term of this patent is extended or adjusted under 35 U.S.C. 154(b) by 0 days.

(21) Appl. No.: 13/917,333

(22) Filed: Jun. 13, 2013

(65) Prior Publication Data

US 2013/0340031 A1 Dec. 19, 2013

Related U.S. Application Data

(60) Provisional application No. 61/660,773, filed on Jun. 17, 2012.

(51) Int. Cl.
*H04L 29/06* (2006.01)
*H04W 12/08* (2009.01)

(52) U.S. Cl.
CPC ........... *H04L 63/0281* (2013.01); *H04L 63/107* (2013.01); *H04W 12/08* (2013.01)

(58) Field of Classification Search
CPC ........... H04L 63/0227; H04L 63/0236; H04L 63/0245; H04L 63/0281; H04L 63/10; H04L 63/107; H04W 12/08
USPC ....................................... 726/1, 12
See application file for complete search history.

(56) References Cited

U.S. PATENT DOCUMENTS

| | | | |
|---|---|---|---|
| 6,892,235 B1 * | 5/2005 | Daude et al. | 709/224 |
| 7,333,990 B1 * | 2/2008 | Thiagarajan et al. | 1/1 |
| 7,590,759 B2 * | 9/2009 | Omar et al. | 709/246 |
| 8,504,809 B2 * | 8/2013 | Chien | 713/1 |
| 8,527,631 B1 * | 9/2013 | Liang | 709/225 |
| 8,594,617 B2 * | 11/2013 | Papakostas et al. | 455/405 |
| 8,676,922 B1 * | 3/2014 | Milner | 709/217 |

(Continued)

FOREIGN PATENT DOCUMENTS

CA 2806548 2/2012

OTHER PUBLICATIONS

"Navigator Proxy Auto-Config File Format" Mar. 1996 (14 pages) https://web.archive.org/web/20070602031929/http://wp.netscape.com/eng/mozilla/2.0/relnotes/demo/proxy-live.html.*
"PACtory Proxy Auto Config Generator" Article dated Feb. 7, 2011 as verified by Internet Archive (1 page) http://web.archive.org/web/20110207062059/http://pactory.sourceforge.net.*
"Pactory-0.99.tar" source code dated Feb. 14, 2010 (26 pages total).*
ServerIron ® Traffic Works L4-7 Configuration Guide; http://foundrynet.com/services/documentation/sichassis/pdfs/ServerIron_Sep2007_ConfigGuide.pdf; Foundry Networks, Inc., Oct. 2007, Chapter 3. (201 pages).

(Continued)

*Primary Examiner* — Joseph P Hirl
*Assistant Examiner* — Thomas Gyorfi
(74) *Attorney, Agent, or Firm* — Tutunjian & Bitetto, P.C.

(57) ABSTRACT

A method, apparatus and product that provide a access control system for mobile devices. The mobile device performing: selecting a proxy to handle a request to a remote server, the request is issued by a program being executed by the mobile device, wherein the proxy is configured to perform a security action in response to the request; and sending the request to the proxy; whereby selectively performing the predetermined security action on a portion of the requests issued by the mobile device. Additionally or alternatively, a computer performing: receiving from a mobile device, an instruction to provide a Proxy Auto Config (PAC) file; and generating a PAC file that comprises a function which is configured to receive a URL and return a proxy to handle a request to the URL, wherein the proxy is configured to perform a security action in response to receiving a request.

20 Claims, 4 Drawing Sheets

(56) References Cited

U.S. PATENT DOCUMENTS

| | | | |
|---|---|---|---|
| 2005/0138604 A1* | 6/2005 | Harrison | 717/121 |
| 2005/0228870 A1 | 10/2005 | de Boor et al. | |
| 2008/0082662 A1* | 4/2008 | Dandliker et al. | 709/225 |
| 2011/0167470 A1 | 7/2011 | Walker et al. | |

OTHER PUBLICATIONS

International Search Report and Written Opinion for International Application No. PCT/IL2013/050506 mailed Oct. 13, 2013. (11 pages).

* cited by examiner

ACCESS CONTROL SYSTEM FOR A MOBILE DEVICE

CROSS-REFERENCE TO RELATED APPLICATION

This application claims the benefit of U.S. Provisional Application No. 61/660,773 filed Jun. 17, 2012, entitled "Granular network access control with minimal client-side footprint", which is hereby incorporated by reference in its entirety.

TECHNICAL FIELD

The present disclosure relates to network access control in general, and to control over network access in mobile devices, in particular.

BACKGROUND

In the mobile domain, Operating Systems (OS), such as mobile OS, the security model is generally much more protective than of that of a traditional OS of desktop systems. In such an OS, programs, also referred to as "apps" may be executed with lower privilege levels and have limited ability to interact and influence the OS as well as other programs. Such a security model may limit the capabilities of security and privacy solutions that are developed for mobile devices, making the device protection task challenging in particular. For example, an iOS™ app cannot monitor and make decisions based on requests sent from other apps on the device.

There are a variety of security and privacy threats (also referred to as threats) that are addressed by security programs. As an example, some applications may implement a functionality that poses a privacy threat, in particular threat to an organization by revealing confidential or sensitive information. This can be due to sending of sensitive information, such as contact lists, calendar meetings, location and/or documents to external servers, thus possibly violating the privacy of the device owner and/or the organization. Regardless of whether the sensitive data is transmitted via an encrypted channel or not, the fact the private information is transmitted to a third party may be problematic and undesired by device owners and organizations.

Some organizations may rely on technologies that forbid the usage of "privacy threatening" applications by its employees. Such a solution bans specific applications altogether and does not differentiate between problematic and non-problematic functionality. In particular, if the application has a business value but poses some threat, such a solution requires the organization/owner to decide whether or not to use the app altogether. In addition, forbidding the usage of an application can be perceived as a dramatic and unwelcome measure, given that the device is owned by the employee in many cases.

Another approach may be to tunnel all of the device traffic to the organization, decrypt if applicable, and inspect it. This approach has severe scalability, performance and privacy drawbacks. Moreover, as the device is used for both personal and corporate needs, keeping the user's personal data private from his/her employer is important.

BRIEF SUMMARY

One exemplary embodiment of the disclosed subject matter is a computer-implemented method performed by a mobile device having a processor and memory, the method comprising: selecting a proxy to handle a request to a remote server, the request is issued by a program being executed by the mobile device, wherein the proxy is configured to perform a predetermined action in response to the request; and sending the request to the proxy; whereby selectively performing the predetermined action on a portion of the requests issued by the mobile device.

Optionally, the selecting is performed by applying proxy selection rules based on one or more characteristics of the request.

Optionally, the characteristic of the request comprise: a Uniform Resource Locator (URL) of the request.

Optionally, the one or more characteristic of the request comprise at least one of: the program initiating the request; a location of the mobile device; and a network used by the mobile device to transmit the request.

Optionally, the method further comprising: receiving a Proxy Auto Config (PAC) file, wherein the PAC file comprises a function configured to select a proxy to a request based on a Uniform Resource Locator (URL) of the request; in response to the request, activating the function of the PAC file to perform the selecting.

Optionally, the PAC file is associated with the program, wherein a request by a different program initiates a proxy selection based on a different PAC file; and wherein the function is configured to determine the proxy based on an identity of the program.

Optionally, the PAC file is associated with a network to which the mobile is connected, and wherein the function is configured to determine the proxy based on the network.

Optionally, the proxy is selected from a set of proxies, each of which is associated with a different security action.

Optionally, the proxy is configured to analyze the request and in response to the analysis perform one of the following actions: block the request; transmit the request to the remote server; transmitting a response to the mobile device; and transmit a modified request to the remote server, wherein the modified request is obtained by applying a security-related logic on the request.

Another exemplary embodiment of the disclosed subject matter is a computer-implemented method performed by a computer having a processor and memory, the method comprising: receiving from a mobile device, an instruction to provide the mobile device with a Proxy Auto Config (PAC) file; wherein the PAC file is to be used by a program of the mobile device when the mobile device is connected to a network; generating a PAC file that comprises a function, wherein the function is configured to receive a Uniform Resource Locator (URL) and return a proxy to handle a request to the URL, wherein the function is configured to make a determination based on at least one of: the program, the URL, and the network, wherein the proxy is configured to perform a predetermined action in response to receiving a request.

Optionally, the PAC file comprises a function utilizing predetermined rule selection logic, wherein the PAC file retains as a constant value a first value indicative of the program and a second value indicative of the network, wherein the predetermined rule selection logic is configured to utilize at least one of the first and second values to select the proxy.

Optionally, requests by the mobile device are selectively routed to the proxy without having a second program in the mobile device to monitor requests issued in the mobile device.

Yet another exemplary embodiment of the disclosed subject matter is a mobile device having a processor, the processor being adapted to perform the steps of: selecting a proxy to handle a request to a remote server, the request is issued by a program being executed by the mobile device, wherein the proxy is configured to perform a predetermined action in response to the request; and sending the request to the proxy; whereby selectively performing the predetermined action on a portion of the requests issued by the mobile device.

Optionally, the selecting is performed by applying proxy selection rules based on one or more characteristics of the request.

Optionally, the characteristic of the request comprise: a Uniform Resource Locator (URL) of the request.

Optionally, the one or more characteristic of the request comprise at least one of: the program initiating the request; a location of the mobile device; and a network used by the mobile device to transmit the request.

Optionally, the processor is further adapted to perform the steps of: receiving a Proxy Auto Config (PAC) file, wherein the PAC file comprises a function configured to select a proxy to a request based on a Uniform Resource Locator (URL) of the request; and in response to the request, activating the function of the PAC file to perform the selecting.

Optionally, the PAC file is associated with a network to which the mobile is connected, and wherein the function is configured to determine the proxy based on the network.

Optionally, the proxy is selected from a set of proxies, each of which is associated with a different action.

Optionally, the proxy is configured to analyze the request and in response to the analysis perform one of the following actions: block the request; transmit the request to the remote server; transmitting a response to the mobile device; and transmit a modified request to the remote server, wherein the modified request is obtained by applying a security-related logic on the request.

THE BRIEF DESCRIPTION OF THE SEVERAL VIEWS OF THE DRAWINGS

The present disclosed subject matter will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings.

DETAILED DESCRIPTION

Figure 1:
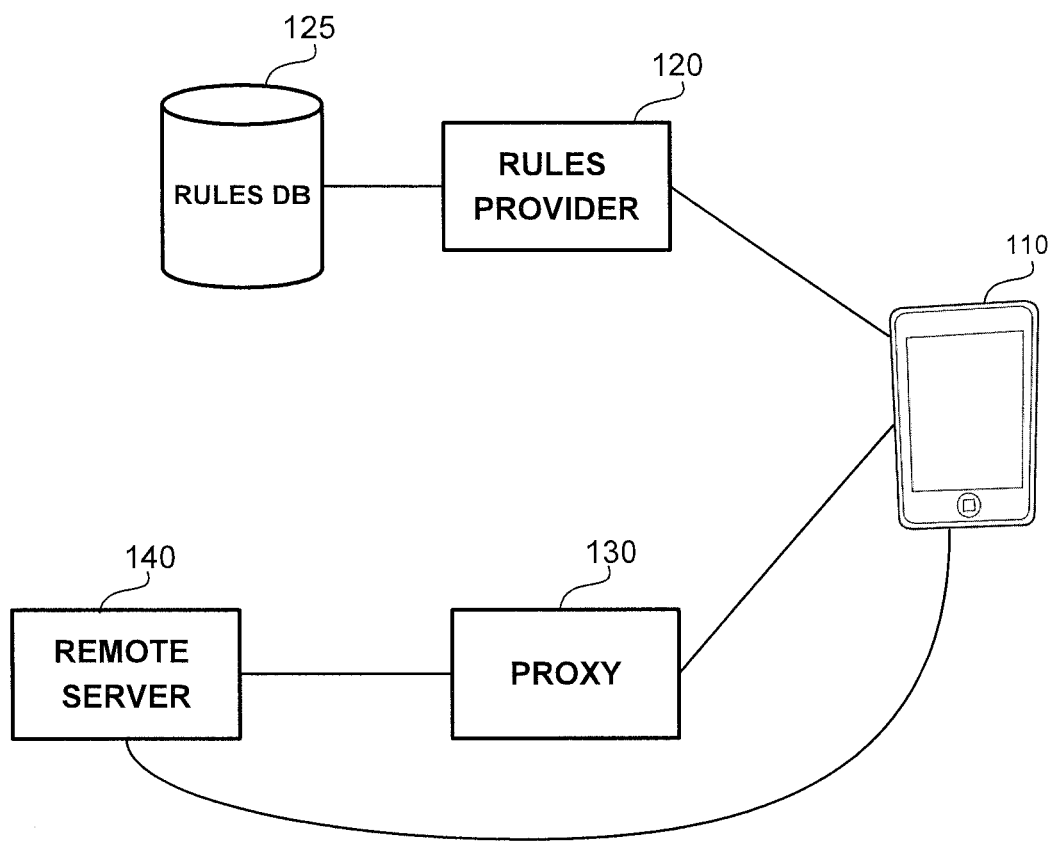
FIG. 1 shows a computerized environment in which the disclosed subject matter is used, in accordance with some exemplary embodiments of the subject matter.

The disclosed subject matter is described below with reference to flowchart illustrations and/or block diagrams of methods, apparatus (systems) and computer program products according to embodiments of the subject matter. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

One technical problem dealt with by the disclosed subject matter is to provide for selective application of security actions on requests issued by a mobile device. In some exemplary embodiments, the mobile device may be any computing platform having a privilege-limited OS which does not provide any application (external to the OS) to monitor requests by other applications.

Another technical problem is for the selective application of security actions to be implemented without depleting a battery of a mobile device. The selective application requires monitoring of all requests, on the one hand, and application of potentially computational intensive security logic on the other hand, it may be characterized in high power consumption profile.

One technical solution is to implement the security action by a proxy. The proxy may be utilized only in a portion of the requests initiated by the mobile device, thereby avoiding routing all communications through the proxy. The mobile device may determine, based on one or more characteristics of a request, whether to perform the security action. Based on such determination, the mobile device may determine whether or not to use the proxy that is configured to perform the security action.

The determination may be based on a Uniform Resource Locator (URL) of the request, such as a domain to which the request is addressed, a protocol being used in the request (e.g., HTTPS, HTTP, FTP, or the like), a location within the domain that is being accessed, or the like. It will be noted that a domain of a URL is different than an Internet Protocol (IP) address of the server. The domain may be translated to one or more IPs, which may change over time, and which may be different for clients that are located in different geographic locations. Furthermore, as the same server may be used for hosting several domains, the IP may correspond to several different domain names. It may be desired to treat each such domain in a different manner, even though they are hosted on the same sever.

The determination may be based on an app initiating the request. Some apps may be known to be trusted and would not require a security action. It may be known that an app does not have access to confidential information and hence there may be no need to perform the security action. Some apps may be deemed as security-important or privacy-important as they have access to confidential, privileged, or private information or resources, or the like. Additionally or alternatively, in case of an organization, some apps may be considered as "private" and the user may not allow the organization to monitor its data, such as for example an email client app that is used for personal purposes.

The determination may be based on a network to which the device is connected. The network may be, for example, a cellular data network (e.g., 3G, GSM EDGE, etc), a Wi-Fi network, a Wireless LAN network, a wired LAN network, or the like. In some exemplary embodiments, based on the network, it may be determined whether to encrypt data being transmitted by the device, such as to mitigate Man in The Middle (MiTM) threats. Additionally or alternatively, all or some of the traffic may be blocked based on the network determination, such as in case of suspected data leakage or when applying network access control. Additionally or alternatively, based on the network, it may be determined to perform HTTP redirection, such as to enforce the usage of predetermined schemes (e.g., only HTTPS not HTTP). Additionally or alternatively, based on the identity of the network, it may be determined to inspect the traffic such as in order to identify suspicious activity and/or content.

The determination may be based on a geo-location of the mobile device. In some exemplary embodiments, the geo-location may be determined based on triangulation, based on a GPS receiver, or the like. Additionally or alternatively, the geo-location may be estimated based on a location of a network, such as a Wi-Fi network, to which the network is connected. In some exemplary embodiments, the location may be a precise location, such as within a radius of a few meters from a waypoint. Additionally or alternatively, the location may be a non-precise location such as a region, a city, a neighborhood, a country, or the like.

The determination may be based on a defined role of a user of the mobile device (e.g., role within the organization), based on the identity of the mobile device (e.g., in case of several clients for the same user), or the like.

In some exemplary embodiments, the determination performed by the mobile device may be a coarse determination in order to consume relatively little resources from the mobile device. Based on the coarse determination, some requests may be determined to not require the security action. However, some requests that may not require such action may still be directed to the proxy. The proxy may determine whether the action is not needed by performing an exact determination which may require additional and potentially substantial system resources, such as CPU time, allocated memory, power consumption, or the like.

Another technical solution is to utilize a Proxy Auto Config (PAC) file in order to selectively route requests to one or more proxy servers. The PAC file may contain a function that is configured to return a proxy server for a given URL. The mobile device may be configured to retrieve the PAC file from a remote server, such as a rules provider server. The mobile device may be further configured to invoke the function of the PAC file in response to a request thereby determining whether the request be handled by a proxy or transmitted directly to a remote server. In some exemplary embodiments, the function is a JavaScript function named FindProxyForURL and is configured to receive two parameters: a URL and a host. However, the disclosed subject matter is not limited to such an embodiment.

In some exemplary embodiments, a PAC file may be used for each app of the mobile device. Additionally or alternatively, in each network, a different PAC may be defined. The PAC file may be dynamically generated to include information that is not passed via parameters, such as an identifier of the mobile device, a role of the user, the app initiating the request, the network to which the mobile device is connected, or the like. During the dynamic generation of the PAC additional information may be obtained and retained in constants in the PAC file to be used upon invocation of the PAC file.

In some exemplary embodiments, a plurality of proxy servers may be utilized. Each of which may be a-priori associated with a security action, such as but not limited to: forward the request to the target server, block the request, close a connection, perform a redirection, encrypt the request, modify the request, or the like.

One technical effect of utilizing the disclosed subject matter is providing for granular network access control and security actions using a relatively limited client-side footprint. The limited footprint includes, for example, relatively low computational requirements, power consumption, or the like.

Another technical effect is to allow performing security actions on encrypted requests without having to decrypt the content of the request. As an example, the disclosed subject matter may allow to detect and prevent private information from leaking out from devices, even if the data itself is transmitted via an encrypted channel, without decrypting the traffic. Such a solution may guarantee a relatively high level of privacy model, as even the protection system itself is unable (and doesn't need) to read the protected, private data. In some exemplary embodiments, the security action is based on a URL, identity of app performing the request and similar information and not on the content of the request itself. As such, the determination does not require decryption of the request in order to determine and potentially perform the security action. In some exemplary embodiments, the disclosed subject matter may be used in a Bring Your Own Device (BYOD) methodology in which the device is owned by an employee and used for both private and business purposes.

Yet another technical effect is providing for a solution that controls the resources each applications is allowed to access based on the network the device is connected to. In some cases, such as when employing BYOD methodology, there may be a need to monitor and control the network access privileges given to apps. For example, the device may have installed thereon apps that the organization is not familiar with and which potentially may contain a vulnerability or even be malware the employee innocently installed on the device. The disclosed subject matter may be utilized to control the resources each application accessed and thereby prevent such apps from gaining access to resources of the organization.

Yet another technical effect is controlling a proxy used by the device in a specific network without being an administrator of the network. According to Web Proxy Auto-Discovery Protocol (WPAD), an administrator of a network may define proxy configuration for devices in the network. The disclosed subject matter may allow for defining such configurations without having any permissions, let alone administrative permissions, in the network itself.

Referring now to FIG. 1 showing a computerized environment in which the disclosed subject matter is used, in accordance with some exemplary embodiments of the subject matter.

A Device 110, such as a smart phone, a Personal Digital Assistant (PDA), a laptop, or the like, may be connected to a network (not shown). Device 110 may be connected to a Wi-Fi network, a cellular network, a wired network, or the like, through which Device 110 can communicate with servers, such as a Remote Server 140. Remote Server 140 may be, for example, a web server, a server configured to provide access to remote or shared resources, or the like. In some exemplary embodiments, Remote Server 140 may contain privileged or confidential information, such as information of an organization.

A Rules DB 125 may be a database retaining security related rules. The rules may define under which circumstances a request that accesses a resource requires a security action. Rules DB 125 may be retained by Rules Provider 120, by Device 110, or may be retained in a remote server. In some exemplary embodiments, a rule may define, based on a characteristic of the request, whether or not to perform a predetermined security action. In some exemplary embodiments, the characteristic may include a URL (or portion thereof) of the resource being accessed, an app of Device 110 initiating the request, a network to which Device 110 is connected or through which the request may be transmitted, a user id associated with the request, an identification of Device 110 that performs the request, a geo-location of Device 110 from which the request is initiated or an estimation thereof, and the like. It will be noted that the IP address to which the request is transmitted, based on URL resolution, such as by a Domain Name Server (DNS), is not part of the characteristic of the request as it may depend upon a routing table in the network, may be different for the same request if operated at different times or from different locations, and may be identical to different requests which access the same physical server over the network (e.g., a server that hosts two different domains). In some exemplary embodiments, the request may contain, in its URL a predetermined IP address to which the request is located. Such an IP address may be considered as part of the characteristic of the request as it is independent of the DNS, routing tables and similar objects that are external to the request, and is explicitly defined by the request itself.

In some exemplary embodiments, Rules DB 125 may allow for enhanced and flexible policies, which may be different for different organizations, different users in the same organization and for different devices of the same user.

One example of a rule may be a pinpointed privacy protection rule. A pinpointed protection rule blocks access to a predetermined URL, such as blocks all accesses to a URL that is related with a known leakage. By blocking a URL, an app using the URL may still be used and not blocked entirely, however the leakage may be blocked.

Another example of a rule may be a network access control. A network access control may block one or more apps, and potentially all apps, from accessing servers in a specific network, such as the network of the organization. In some exemplary embodiments, an IP of the server being accessed may be resolved such as using a DNS, routing table, or the like. The determination may be based on the resolved IP.

Yet another example of a rule may be a data leakage protection rule. A data leakage protection rule may require analysis of a content of a request before forwarding the request to its destination. As an example, a request to a URL of the form "*/upload" by a predetermined app or by all apps may be tunneled to Proxy 130 that may be configured to analyze its content and ensure that the uploaded file does not contain confidential information. Data leakage protection rule may be used to scan attachment using a predefined proxy by tunneling requests of a specific URL (e.g., a URL defined using HTTP protocol to access the resource: "web.mail/getAttachment"). Data leakage protection rule may be used to avoid or alert of problematic configuration. In case the tunneled request is a request to configure an app, the Proxy 130 may inspect to requested configuration and determine whether it is considered problematic or not (e.g., promiscuous sharing settings in a social network application). The user may be alerted of such configuration. Additionally or alternatively, the configuration request may be blocked.

Yet another example of a rule is a selective network access control rule. A selective network access control rule may block an app from accessing a resource (e.g., a URL, the Internet, or the like) when Device 110 is connected to a specific network. As an example, such a rule may be used to limit network usage of specific network connections (e.g., cellular data network, networks associated with the organization). Additionally or alternatively, such a rule may block specific apps from gaining access to a predefined network. In some exemplary embodiments, an app, such as a file sharing app, may be blocked from accessing the Internet when using a Wi-Fi network of the organization.

Yet another example of a rule is an installation control rule. An installation control rule may block attempts to install certain applications, such as by blocking an app that installs apps (e.g., AppStore™ in iPhone™ or Play™ in an Android™ mobile device) from accessing a URL associated with the applications. As an example, the app may be blocked from accessing a URL of the form "*.badapp.apk" which is associated with an app that is determined to be blocked.

Yet another example of a rule may be a rule that is based on the protocol of the URL. In some cases, if the URL uses an FTP (File Transfer Protocol), the request may be tunneled for inspection. Additionally or alternatively, if the URL is an HTTPS request, which is known to be encrypted, the request may be transferred as is. In some cases, a request that uses a non-encrypted protocol may be tunneled through a server for encryption.

In some exemplary embodiments, the rules of Rules DB 125 may be defined manually by an administrator (not shown) may be based on known security issues and optionally a-priori provided. In some exemplary embodiments, the administrator may determine blocking and tunneling at different granular levels. The blocking/tunneling may be performed for all apps, a portion of the apps, a specific app. Additionally or alternatively, the blocking/tunneling decision may depend on specific network to which Device 110 is connected, the location of Device 110, the identity of the user using Device 110 and his role in the organization, the identity of the device in case the same user is associated with several devices, or the like.

In some exemplary embodiments, the Rules DB 125 may define rules that determine whether to perform a security action in response to a request. The security action may be, for example, tunneling the request to be monitored and analyzed, modifying the request, blocking the request, or the like. In some exemplary embodiments, one or more proxies, such as Proxy 130, may be associated with the security action. Each such proxy may be configured to perform a predetermined security action when receiving a request. In case a rule requires a specific security action, the request may be tunneled through the proxy to perform the security action.

In some exemplary embodiments, blocking the request may be performed by tunneling the request to a specific proxy that drops all requests or by addressing the request to a non-existing proxy server.

In some exemplary embodiments, Rules Provider 120 may be configured to provide the rules to Device 110 or relevant portions thereof. Rules Provider 120 may be a server accessible by Device 110. In some exemplary embodiments, the Rules Provider 120 may be configured to provide a PAC file to Device 110. The PAC file may be served using any file serving techniques (e.g., HTTP, FTP, HTTPS, local file access, or the like). Rules Provider 120 may dynamically generate a PAC file for Device 110. In some exemplary embodiments, each application may be served with a different PAC file and thereby each PAC file may be dynamically generated so as to relate to the app to which it is associated. Additionally or alternatively, each app may be served with a different PAC file in each connected network, thereby allowing the PAC file to be associated with an app and a network and include the relevant rules thereto. In some exemplary embodiments, rules can be dynamic, based on the user, its role(s), client device identifier, application, geo-location, the network the device is connected through, or the like. Serving a different PAC file for different scenarios may allow the system to gain high granularity in its policies.

In some exemplary embodiments, Device 110 may be configured, such as by a configuration app, to request the PAC file from Rules Provider 120. The request of the PAC file may include passing to Rules Provider 120 information relating to relevant parameters, such as the network, its estimated location (e.g., for a wired network or wireless network of limited range such as a Wi-Fi network), the app, the user and its role(s), the device identification, or the like. In some exemplary embodiments, Device 110 may request the PAC file from Rules Provider 120 using an HTTP request which may use GET request to provide such information.

In some exemplary embodiments, upon initiating a request by Device 110, the rules provided to Device 110 (e.g., the PAC file) may be applied on the request to determine whether to direct the request directly to Remote Server 140 or whether to tunnel the request through Proxy 130 which is configured to perform a predetermined security action. By having a plurality of proxies, the security action may be selected from a plurality of potential security actions. Additionally or alternatively, the same proxy may implement a plurality of predetermined security actions. Based upon the request to the proxy, one security action may be selected to be performed from the plurality of predetermined security actions.

In some exemplary embodiments, Device 110 may initiate a plurality of requests, some may be transmitted directly to their destination (e.g., Remote Server 140) and some may be tunneled through proxies (e.g., Proxy 130). Each request may be handled differently based on its characteristic and based on the rules provided to Device 110.

Figure 2:
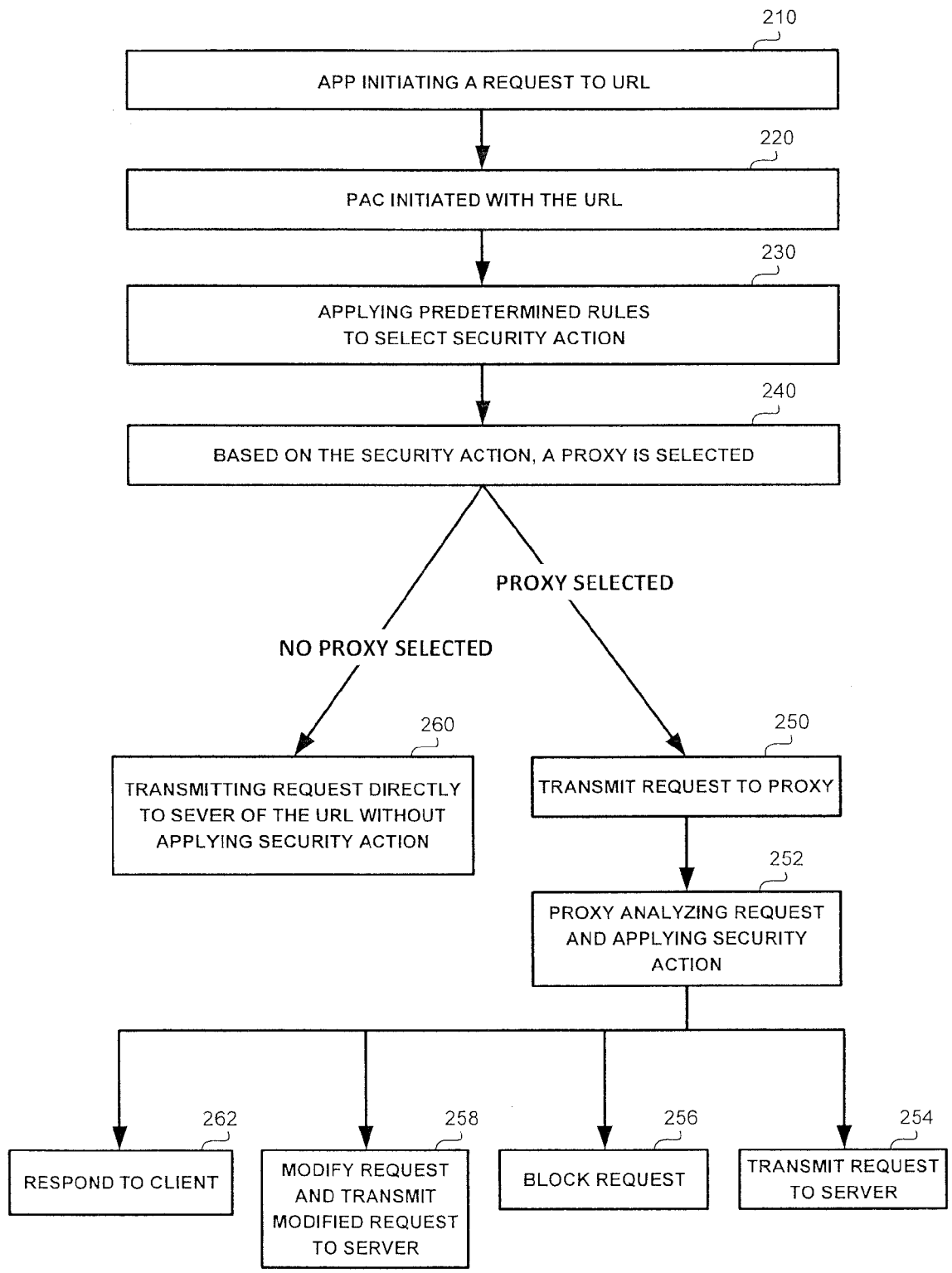
FIG. 2 shows a flowchart diagram of a method, in accordance with some exemplary embodiments of the disclosed subject matter.

Referring now to FIG. 2 showing a flowchart diagram of a method, in accordance with some exemplary embodiments of the disclosed subject matter. In some exemplary embodiments, the method of FIG. 2 may be performed by a device, such as 110 of FIG. 1.

In Step 210, an app may initiate a request to a resource. The request may be associated with a URL.

In Step 220, Proxy Auto Configuration (PAC) may be initiated with the URL. The PAC may be implemented by a function in a PAC file that receives the URL and returns the proxy to be used. In some exemplary embodiments, the function may be configured to receive in addition to the URL a host.

In Step 230, the rules of the PAC may be applied to select a security action to be performed on the request. In some exemplary embodiments, the rules may be provided by a Rules Provider. In some exemplary embodiments, the rules may take into account request characteristics such as but not limited to user role, device id, connected network, app initiating the request, location of the device, or the like.

In some exemplary embodiments, PAC may be implemented by a PAC file. In some exemplary embodiments, the PAC file may be a unique PAC file for the app and therefore its determination may take into account in its decision the identity of the app that initiates the request. Additionally or alternatively, the PAC file may be a unique PAC file for the app when the device is connected to the network, and therefore may take into account the identity of the network through which the request will be transmitted.

Information required for PAC may be obtained when PAC is initiated (e.g., URL and host), a-priori retained by the PAC implementation (e.g., constant values in the PAC file identifying the user's role, the app, the network, approximate position of the network, or the like), dynamically obtained (e.g., utilizing GPS to determine current location), combination thereof or the like.

In Step 240, based on the determined security action, a proxy may be selected. The proxy may be configured to perform the selected security action. In case no security action is determined, no proxy is selected and in Step 260, the request is transmitted directly to the server of the URL without applying any security action.

In case a proxy is selected, Step 250 may be performed and the request may be transmitted to the selected proxy. The proxy may then apply the security action on the request (Step 252) with or without analyzing its content.

In some exemplary embodiments, the proxy server may decide, based on the content of the request, its characteristic, or the like, to transmit the request to its destination (254), to block the request (256), to modify the request and transmit the modified request (258), or the like. In some exemplary embodiments, the proxy server may decide to respond to the client on behalf of the server (262). As one non-limiting example, the proxy server may determine to enforce an HTTPS scheme over an HTTP scheme, such as in case the destination supports both schemes or in case there is an alternative destination that is functionally equivalent to the destination which supports HTTPS requests. In such a case, the proxy server may respond to the client with a command to initiate a redirection, such as 301, 302 or 307 redirections. Other actions may include different security-related responses other than redirection invocations.

In some exemplary embodiments, the request may be modified to be directed to a different URL, to utilize a different protocol, to include different content (e.g., different configuration, redacted file, or the like).

Figure 3:
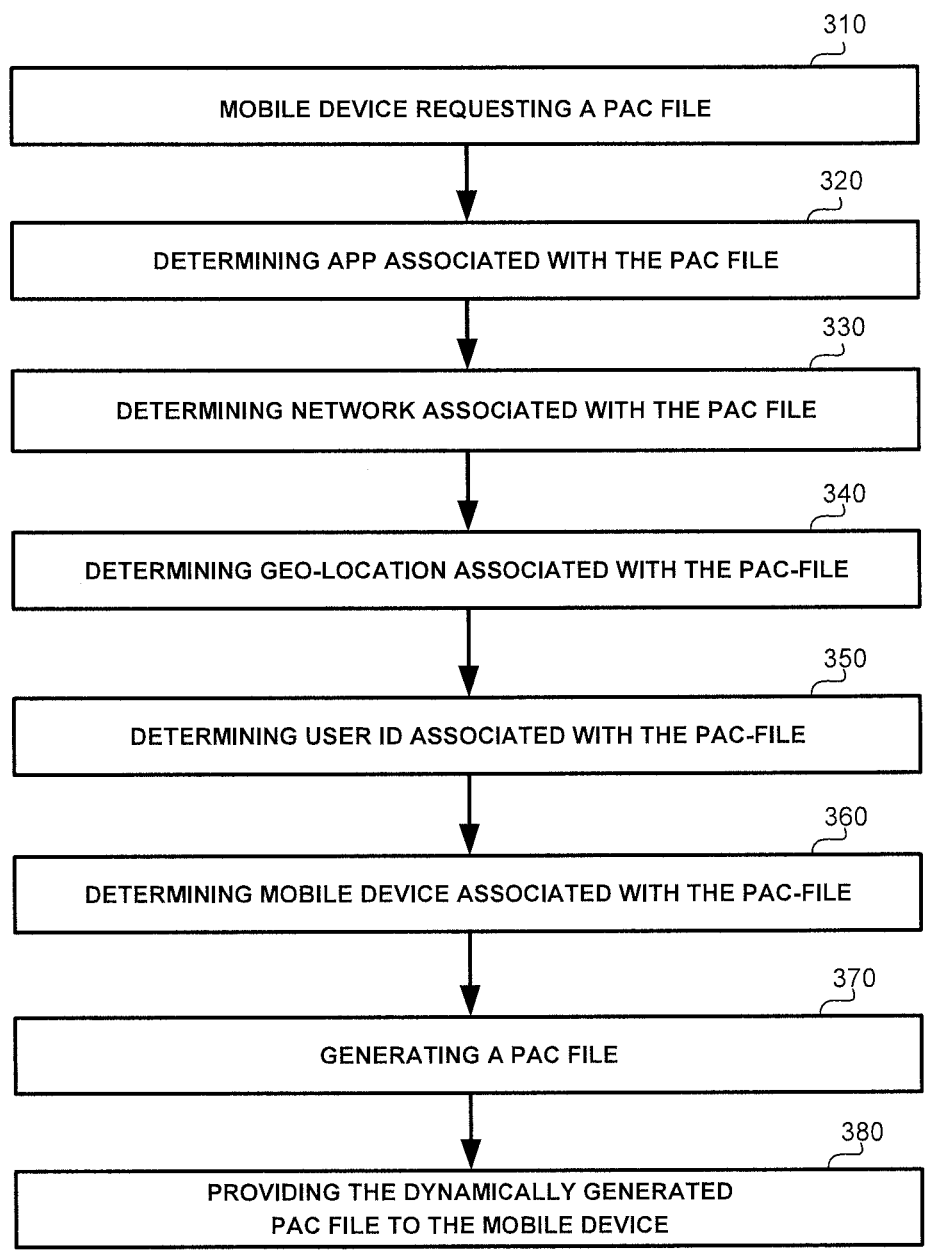
FIG. 3 shows a flowchart diagram of a method, in accordance with some exemplary embodiments of the disclosed subject matter.

Referring now to FIG. 3 showing a flowchart diagram of a method, in accordance with some exemplary embodiments of the disclosed subject matter. The method of FIG. 3 may be performed by a Rules Provider, such as 120 of FIG. 1.

In Step 310, a device, such as a mobile device, may request a PAC file.

In Step 320, the app that is associated with the PAC file may be determined. The identity of the app may be determined, for example, based on information provided in the request of Step 310, such as POST or GET parameters, or the like. Additionally or alternatively, the request may comprise headers, such as HTTP headers. The request headers may be utilized to identify the app. For example, a user-agent header field may include an identification of the app initiating the request.

In Step 330, the network associated with the PAC file may be determined. In some exemplary embodiments, the network is determined based on information provided in the request.

In Step 340, geo-location associated with the PAC file may be determined. The geo-location may be a location or a proximate location of the network. In some exemplary embodiments, the location may be provided in the request.

In Step 350, a user id associated with the PAC file may be determined. The user id may be an identification of the user using the device. Based on the user id, a role of the user in an organization may be determined thereby allowing to apply for users having similar roles, similar rules. In some exemplary embodiments, the user identification and/or role may be provided in the request.

In Step 360, a mobile device that is associated with the PAC file may be determined. A single user may utilize several devices, such as a laptop, a tablet and a mobile phone, each of which may be associated with similar yet different rules. The mobile device identification may be determined. In some exemplary embodiments, the identification of the mobile device may be provided in the request.

In some exemplary embodiments, in any of Steps 320-360, the information may be obtained from the request of Step 310. Additionally or alternatively, the information may be determined by the Rules Provider, such as determining the user's roles based on the user identification, initiating a request to an app installed on mobile device to determine current location, current connected network, or the like.

In Step 370, a PAC file may be generated. In some exemplary embodiments, the PAC file may include a function operative to receive a URL and a host and return a proxy based on application of rules. In some exemplary embodiments, the function may implement only rules that are applicable to the device in accordance with the information obtained in Steps 320-360.

In some exemplary embodiments, the function may be generated so as to include constant values that indicate the information obtained in Steps 320-360 and be used when applying the rules. In such an embodiment, each rule may be implemented as function that is configured to receive the information using one or more parameters. The PAC function may include a constant assignment section, which is generated based on the values determined in steps 320-360, and invocation section which invokes the relevant functions and providing the function the constant information. In some exemplary embodiments, some information, such as geo-location in a cellular network, may not be constant and a-priori known and may be dynamically determined upon invocation of the PAC function.

In Step 380, the dynamically generated PAC file may be served to the device to be employed by the device in response to invocations of requests.

Figure 4A:
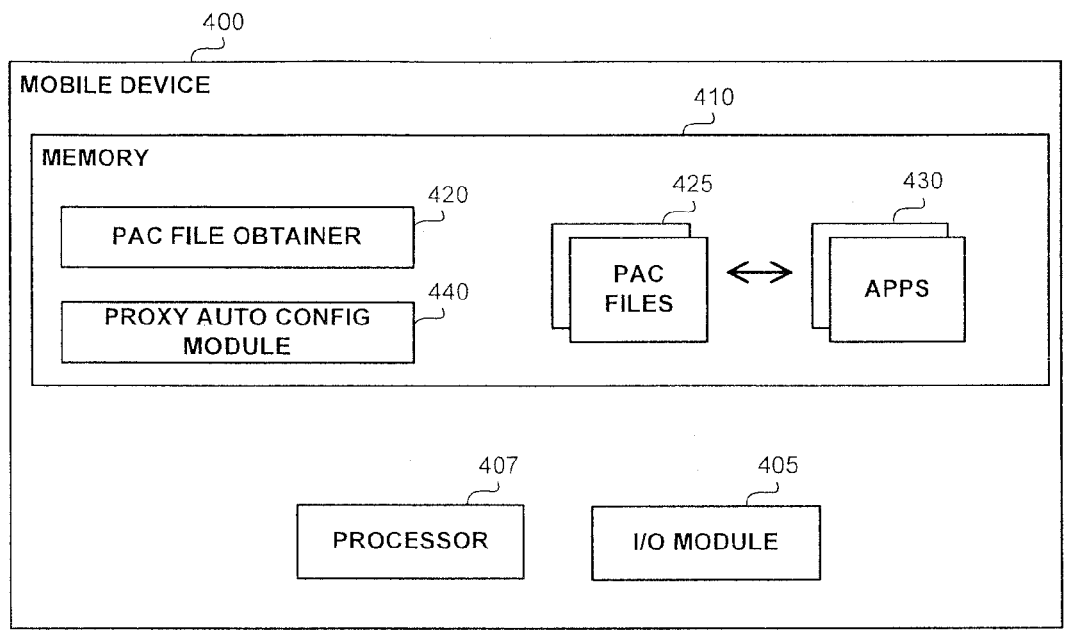
FIG. 4A-4C show block diagrams of apparatuses, in accordance with some exemplary embodiments of the disclosed subject matter.

Referring now to FIG. 4A showing a block diagram of an apparatus, in accordance with some exemplary embodiments of the disclosed subject matter. Mobile Device 400 may be a device such as 110 of FIG. 1 and may be configured to perform steps of the method of FIGS. 2 and 3.

In some exemplary embodiments, Mobile Device 400 may comprise a Processor 407. Processor 407 may be a Central Processing Unit (CPU), a microprocessor, an electronic circuit, an Integrated Circuit (IC) or the like. Processor 407 may be utilized to perform computations required by Mobile Device 400 or any of it subcomponents.

In some exemplary embodiments of the disclosed subject matter, Mobile Device 400 may comprise an Input/Output (I/O) Module 405. I/O Module 405 may be utilized to provide an output to and receive input from a user. I/O Module 405 may be configured to provide network connection to Mobile Device 400, to allow connectivity to servers such as a Rules Provider (e.g. 120), a Proxy (e.g., 130), and a Remote Server (e.g., 140).

In some exemplary embodiments, Mobile Device 400 may comprise a Memory 410. Memory 410 may be a hard disk drive, a Flash disk, a Random Access Memory (RAM), a memory chip, or the like. In some exemplary embodiments, the Memory 410 may retain program code operative to cause Processor 407 to perform acts associated with any of the subcomponents of Apparatus 400 and/or steps of FIGS. 2-3.

PAC File Obtainer 420 may be configured to obtain a PAC file from a server, such as a rules provider. PAC File Obtainer 420 may be configured to issue a request for a PAC file (Step 310). PAC File Obtainer 420 may be configured to provide the server generating the PAC file with information such as the app for which the PAC file will be used, the network, the user id, the device id, the geo-location, or the like. In some exemplary embodiments, PAC File Obtainer 420 may obtain PAC files 425 each of which may be predetermined to be associated with an app of Apps 430. In some exemplary embodiments, a single app may be associated with a plurality of PAC files, each of which associated with a specific network.

Proxy Auto Configuration (PAC) Module 440 may be configured to perform PAC, such as using PAC Files 425. In some exemplary embodiments, PAC Module 440 may be configured to invoke a PAC function of a relevant PAC file for a request, such as a PAC file that is associated with the app initiating the request and the network to which Mobile Device 400 is connected.

Figures 4B, 4C:
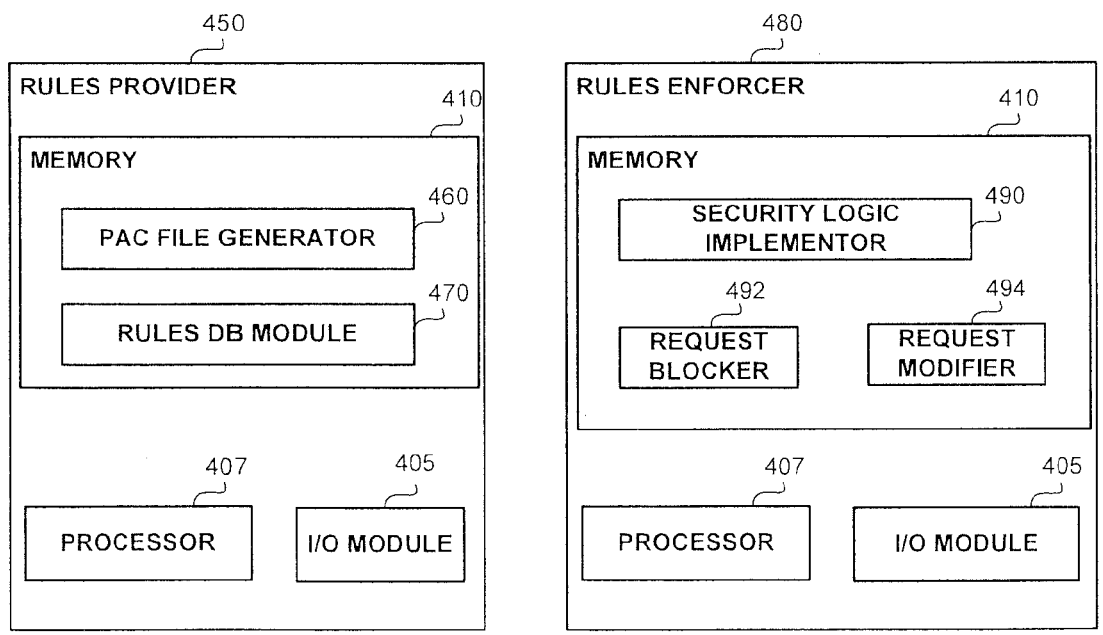

Referring now to FIG. 4B showing a block diagram of an apparatus, in accordance with some exemplary embodiments of the disclosed subject matter. Rules Provider 450, such as 120 of FIG. 1, may be configured to perform steps of the method of FIG. 3. Similarly to Mobile Device 400, Rules Provider 450 may comprise Processor 407, I/O Module 405, and Memory Unit 410.

PAC File Generator 460 may be configured to generate a PAC file. Generation may be performed such as by performing steps 320-380 of FIG. 3. The PAC file may be generated based upon rules that may be retained in a Rules DB, such as 125. A Rules DB Module 470 may be utilized to obtain relevant rules from a rules DB (not shown) which may be a local server, a remote server, or the like.

Referring now to FIG. 4C showing a block diagram of an apparatus, in accordance with some exemplary embodiments of the disclosed subject matter. Rules Enforcer 480, such as Proxy 130 of FIG. 1, may be configured to perform Steps 252-258, 262 of the method of FIG. 2. Similarly to Mobile Device 400, Rules Enforcer 480 may comprise Processor 407, I/O Module 405, and Memory Unit 410.

A Security Logic Implementor (SLI) 490 may be configured to perform a predetermined security action. In some exemplary embodiments, the Rules Enforcer 480 may be associated with one or more security action and may perform the security actions upon receipt of a request. SLI 490 may utilize a Request Blocker 492 to block certain requests, such as all requests received by Rules Enforcer 480, request containing unauthorized data, or the like. Additionally or alternatively, SLI 490 may modify a request using Request Modifier 494 and transmit the modified request to the target server. Additionally or alternatively, SLI 490 may transmit a response instead of forwarding the request to the target server, such as for exampling redirecting the client to another URL. The other URL may be an HTTPS version of the requested URL.

Additionally or alternatively, SLI 490 may determine, such as based on the characteristics of the request, the content of the request, or the like, that the request is permitted and transmit it to the target server.

In some exemplary embodiments, SLI 490 may implement computational intensive logic. Such logic may be associated with relatively high resource consumption (e.g., CPU time, memory, power, or the like). Therefore, some computations that can be performed by the Device 110 may be performed by Rules Enforcer 480. As an example, in some embodiments, SLI 490 may be configured to complete application of the security rules of the Rules DB. Mobile Device 400 may be configured to apply a coarse application of the rules and the Rules Enforcer 480 may complete the application of the rules thereby avoiding relatively high client-side footprint and reducing resources consumed by the Mobile Device 400 for the security and privacy related tasks of the disclosed subject matter.

In some exemplary embodiments, the disclosed subject matter may be utilized to provide for selective encryption of the requests thereby providing secured connection even when the app issues non-secured requests. The mobile device may be connected to one or more of the proxies through secured channel, such as a Virtual Private Network (VPN).

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of program code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As will be appreciated by one skilled in the art, the disclosed subject matter may be embodied as a system, method or computer program product. Accordingly, the disclosed subject matter may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, and the like.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer-implemented method performed by a mobile device having a processor and memory, the method comprising:

receiving a Proxy Auto Config (PAC) file in response to a PAC request, wherein the PAC request identifies parameters of the mobile device, wherein the PAC file correlates to the parameters of the mobile device, wherein the PAC file comprises a function configured to select a proxy to a request based on a Uniform Resource Locator (URL) of the request, wherein the function is configured to apply a portion of selection rules, wherein the portion of the selection rules is selected automatically from a set of security related selection rules based on the PAC request;

selecting a proxy to handle a request to a remote server, the request is issued by a program being executed by the mobile device, wherein the proxy is configured to perform a predetermined action in response to the request, wherein in response to said request, activating the function of the PAC file to perform said selecting; and sending the request to the proxy.

2. The computer-implemented method of claim 1, wherein said selecting is performed by applying proxy selection rules based on the parameters of the mobile device, which were obtained from the PAC request and which are statically retained in the PAC file using a variable having a constant value.

3. The computer-implemented method of claim 2, wherein said applying the proxy selection rules is further based on a Uniform Resource Locator (URL) of the request.

4. The computer-implemented method of claim 2, wherein the parameters of the mobile device comprise
a network used by the mobile device to transmit the request, wherein the network is a Wi-Fi network, a Wireless LAN network, a wired LAN network, or a cellular data network.

5. The computer-implemented method of claim 1, wherein the PAC file is associated with the program, wherein a request by a different program initiates a proxy selection based on a different PAC file; and wherein the function is configured to determine the proxy based on an identity of the program.

6. The computer-implemented method of claim 1, wherein the PAC file is associated with a network to which the mobile is connected, and wherein the function is configured to determine the proxy based on the network.

7. The computer-implemented method of claim 1, wherein the proxy is selected from a set of proxies, each of which is associated with a different action.

8. The computer-implemented method of claim 1, wherein the proxy is configured to analyze the request and in response to the analysis perform one of the following actions:
block the request;
transmit the request to the remote server;
transmitting a response to the mobile device; and
transmit a modified request to the remote server, wherein the modified request is obtained by applying a security-related logic on the request.

9. The computer-implemented method of claim 1, wherein the predetermined action is a predetermined security action, wherein the predetermined security action includes applying a security-related logic on the request to create a modified request and transmitting the modified request to the remote server.

10. The computer-implemented method of claim 2, wherein said applying the proxy selection rules is further based on a geo-location of the mobile device.

11. A computer-implemented method performed by a computer having a processor and memory, the method comprising:
receiving from a mobile device, an instruction to provide the mobile device with a Proxy Auto Config (PAC) file; wherein the PAC file is to be used by a program of the mobile device when the mobile device is connected to a network; and
dynamically generating a PAC file for the mobile device, wherein the PAC file comprises a function, wherein the function is configured to receive a Uniform Resource Locator (URL) and return a proxy to handle a request to the URL, wherein the function is configured to make a determination based on an identity of the network to which the mobile device is connected, wherein the network is a Wi-Fi network, a Wireless LAN network, a wired LAN network, or a cellular data network, wherein the proxy is configured to perform a predetermined action in response to receiving a request;

whereby requests by the mobile device are selectively routed to the proxy without having a second program in the mobile device to monitor requests issued in the mobile device.

12. The computer-implemented method of claim 11, wherein the PAC file comprises a function utilizing predetermined rule selection logic, wherein the PAC file retains as a constant value a first value indicative of the program and a second value indicative of the network, wherein the predetermined rule selection logic is configured to utilize at least one of the first and second values to select the proxy.

13. The computer-implemented method of claim 11, wherein said dynamically generating comprises selecting a subset of selection rules from a set of selection rules retained in a rules database, wherein said selecting the subset of selection rules is performed based on parameters of the instruction to provide the PAC file, wherein the set of selection rules are security related rules, wherein the function is configured to apply the subset of selection rules.

14. A mobile device having a processor, the processor being adapted to perform the steps of:
receiving a Proxy Auto Config (PAC) file in response to a PAC request, wherein the PAC request identifies parameters of the mobile device, wherein the PAC file correlates to the parameters of the mobile device, wherein the PAC file comprises a function configured to select a proxy to a request based on a Uniform Resource Locator (URL) of the request, wherein the function is configured to apply a portion of selection rules, wherein the portion of the selection rules is selected automatically from a set of security related selection rules based on the PAC request;

selecting a proxy to handle a request to a remote server, the request is issued by a program being executed by the mobile device, wherein the proxy is configured to perform a predetermined action in response to the request, wherein in response to said request, activating the function of the PAC file to perform said selecting; and sending the request to the proxy.

15. The mobile device of claim 14, wherein said selecting is performed by applying proxy selection rules based on the parameters of the mobile device, which were obtained from the PAC request and which are statically retained in the PAC file using a variable having a constant value.

16. The mobile device of claim 15, wherein said applying the proxy selection rules is further based on a Uniform Resource Locator (URL) of the request.

17. The mobile device of claim 15, wherein the parameters of the mobile device comprise at least one of:
the program initiating the request;
a location of the mobile device; and
a network used by the mobile device to transmit the request.

18. The mobile device of claim 14, wherein the PAC file is associated with a network to which the mobile is connected, and wherein the function is configured to determine the proxy based on the network.

19. The mobile device of claim 14, wherein the proxy is selected from a set of proxies, each of which is associated with a different action.

20. The mobile device of claim 14, wherein the proxy is configured to analyze the request and in response to the analysis perform one of the following actions:
- block the request;
- transmit the request to the remote server;
- transmitting a response to the mobile device; and
- transmit a modified request to the remote server, wherein the modified request is obtained by applying a security-related logic on the request.

* * * * *